United States Patent
Lee et al.

(10) Patent No.: US 10,323,626 B2
(45) Date of Patent: Jun. 18, 2019

(54) DISPLAY DEVICE AND ELECTRONIC DEVICE INCLUDING THE SAME

(71) Applicant: Samsung Electronics Co., Ltd., Gyeonggi-do (KR)

(72) Inventors: June-Suk Lee, Seoul (KR); Won-Wook Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 15/483,295

(22) Filed: Apr. 10, 2017

(65) Prior Publication Data
US 2017/0292503 A1    Oct. 12, 2017

(30) Foreign Application Priority Data
Apr. 11, 2016  (KR) .................... 10-2016-0044202

(51) Int. Cl.
| H05K 5/00 | (2006.01) |
| H05K 7/00 | (2006.01) |
| F03G 7/06 | (2006.01) |
| G06F 1/16 | (2006.01) |

(52) U.S. Cl.
CPC ........... *F03G 7/065* (2013.01); *G06F 1/1616* (2013.01); *G06F 1/1626* (2013.01)

(58) Field of Classification Search
CPC ...................................................... H05K 5/03
USPC ................................................... 361/679.01
See application file for complete search history.

(56) References Cited

U.S. PATENT DOCUMENTS

| 5,816,306 A * | 10/1998 | Giacomel ............... E06B 9/368 160/6 |
| 8,787,016 B2 | 7/2014 | Rothkopf et al. |
| 2003/0214746 A1* | 11/2003 | Oh .......................... G11B 19/22 360/74.1 |
| 2004/0231213 A1 | 11/2004 | Ha et al. |
| 2010/0208417 A1 | 8/2010 | Visser et al. |
| 2013/0131887 A1 | 5/2013 | Park |

(Continued)

FOREIGN PATENT DOCUMENTS

| JP | 2003-280546 A | 10/2003 |
| KR | 10-0770984 B1 | 10/2007 |
| KR | 10-2011-0048640 A | 5/2011 |

(Continued)

*Primary Examiner* — Jerry Wu
(74) *Attorney, Agent, or Firm* — Cha & Reiter, LLC.

(57) ABSTRACT

A display device and/or an electronic device including the same includes a flexible display panel, a driving device having a shape memory alloy member and a temperature control device adapted to control a temperature of the shape memory alloy member, and a link part, one end of which is connected to at least one end portion of the flexible display panel and another end of which is connected to the driving device, in which the driving device changes a curvature of the flexible display panel by controlling the temperature of the shape memory alloy member using the temperature control device, so that a force generated by shape memory alloy member when assuming a predetermined shape drives the link part to move the at least one end portion of the flexible display panel. The display device and/or the electronic device including the same may be implemented variously depending on embodiments.

12 Claims, 9 Drawing Sheets

(56) References Cited

U.S. PATENT DOCUMENTS

2013/0155655 A1* 6/2013 Lee .................... H05K 5/03
362/97.1
2014/0303563 A1 10/2014 Moeller et al.

FOREIGN PATENT DOCUMENTS

| KR | 10-2011-0088870 A | 8/2011 |
| KR | 10-1278123 B1 | 6/2013 |
| KR | 10-1492852 B1 | 2/2015 |

* cited by examiner

DISPLAY DEVICE AND ELECTRONIC DEVICE INCLUDING THE SAME

CLAIM OF PRIORITY

This application claims the benefit under 35 U.S.C. § 119(a) of a Korean patent application filed in the Korean Intellectual Property Office on Apr. 11, 2016 and assigned Serial No. 10-2016-0044202, the entire disclosure of which is incorporated herein by reference.

TECHNICAL FIELD

Various embodiments of the present disclosure relate to a display device, for example, a display device including a flexible display panel and/or an electronic device including the display device.

BACKGROUND

Electronic devices refer to devices that perform particular functions based on embedded or stored programs and software, such as home appliances, electronic notes, portable multimedia players (PMPs), and mobile communication terminals, tablet personal computers (PCs), video/audio devices, desktop/laptop computers, vehicle navigation systems, and so forth. For example, these electronic devices may output stored information in the form of texts, sound, images, and so forth. With the increasing integration of electronic devices in everyday life and the common use of ultra-high-speed and large-volume wireless communication, various and multiple functions have been recently provided through a single electronic device. For example, an entertainment function such as games, a multimedia function such as music/video playback, a communication and security function for mobile banking, and a function such as schedule management, electronic wallets, or the like, as well as a communication function have been integrated into a mobile communication terminal.

Examples of a display device that outputs content, e.g., texts, images, etc., to provide various visual information to users of electronic devices may be a display device such as a television, a projector, a screen of a mobile communication terminal, and so forth. In line with advances in liquid crystal display (LCD) devices, organic light-emitting diode (OLED) devices, and the like, technical advances for flat-panel displays have been sharply increasing.

As the size of a flat-panel display increases, distortion may occur in the screen depending on a position where a user who views the screen output in relation to the flat-panel display. For example, an image output from a portion of the screen close to the user may be seen larger than an image output from a portion far from the user. Such distortion may occur depending on a user's relative position or distance with respect to the display panel and may occur also in a miniaturized electronic device (e.g., a mobile communication terminal).

In some commercialized display devices (electronic devices), such distortion may be alleviated and comfortable viewing environments may be provided using a curved-surface display panel. However, the user's relative position with respect to the display panel is not fixed at all times. Therefore, a fixed curved-surface display panel does not solve the problem at all times. For example, a fixed curved-surface display panel may be optimized to provide images for a user at a certain location with respect to the panel but not when the user is at other locations.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure provide a display device and/or an electronic device, which is capable of setting a form, such as curvature, and the like, variously based on a user's relative position, and so forth.

According to one or embodiments of the present disclosure, there is provided a display device and/or an electronic device including the same, including a flexible display panel, a driving device having a shape memory alloy member and a temperature control device adapted to control a temperature of the shape memory alloy member, and a link part, one end of which is connected to at least one end portion of the flexible display panel and another end of which is connected to the driving device, in which the driving device changes a curvature of the flexible display panel by controlling the temperature of the shape memory alloy member using the temperature control device, so that a force generated by shape memory alloy member when assuming a predetermined shape drives the link part to move the at least one end portion of the flexible display panel.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. In regard to the description of the drawings, like reference numerals refer to like elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (PoS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device.

Figure 1:
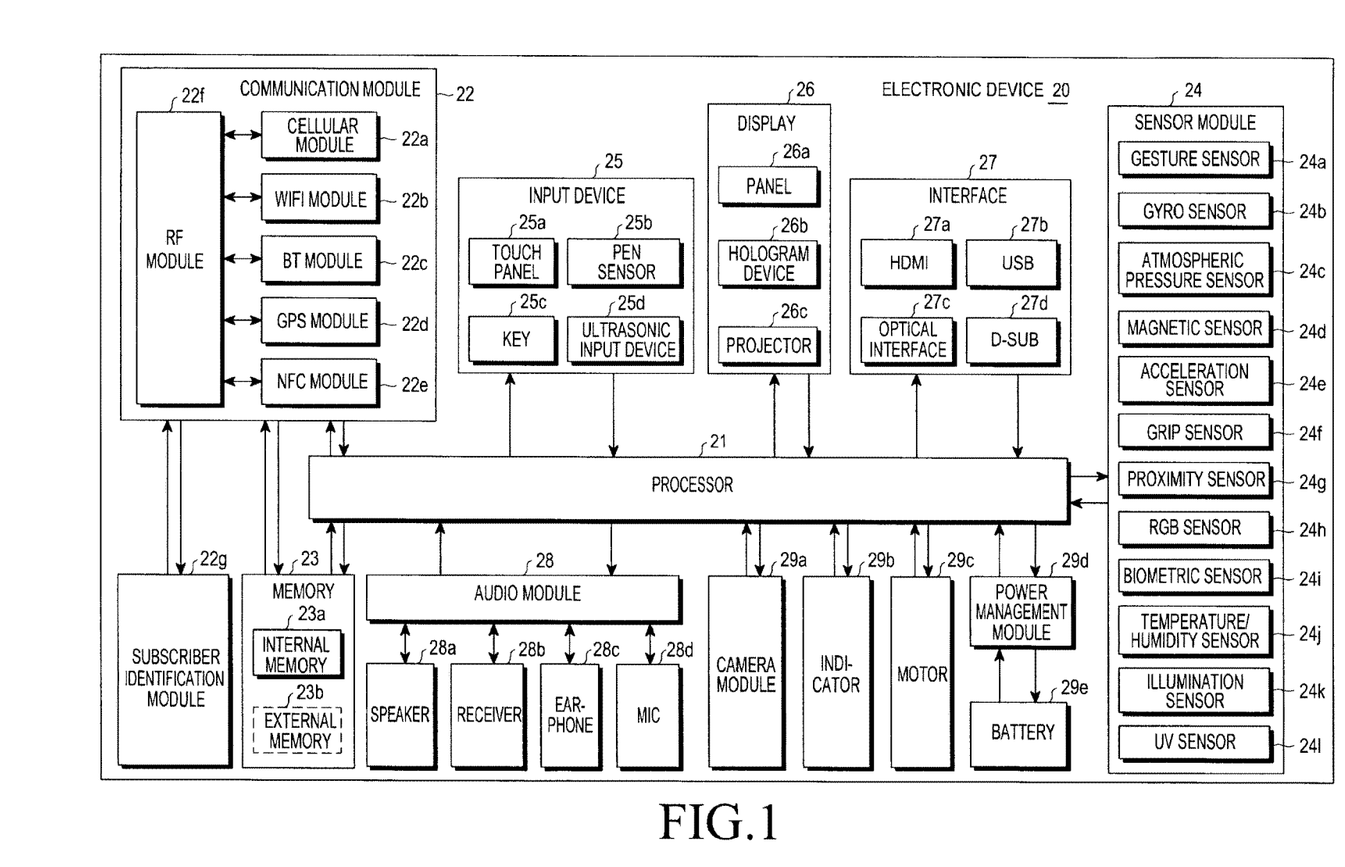
FIG. 1 is a block diagram of an electronic device according to one embodiment of the present disclosure.

FIG. 1 is a block diagram of an electronic device 20 according to one embodiment of the present disclosure.

The electronic device 20 may include one or more processors (e.g., application processors (APs)) 21, a communication module 22, a subscriber identification module (SIM) 22g, a memory 23, a sensor module 24, an input module 25, a display 26, an interface 27, an audio module 28, a camera module 29a, a power management module 29d, a battery 29e, an indicator 29b, and a motor 29c. The processor 21 controls multiple hardware or software components connected to the processor 21 by driving an Operating System (OS) or an application program, and performs processing and operations with respect to various data. The processor 21 may be implemented with, for example, a system on chip (SoC). According to an embodiment of the present disclosure, the server 21 may include a GPU and/or an image signal processor. The processor 21 may include at least some of the elements illustrated in FIG. 1 (e.g., the cellular module 22a). The processor 21 loads a command or data received from at least one of other elements (e.g., a non-volatile memory) into a volatile memory to process the command or data, and stores result data in the non-volatile memory. The processor 21 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer executes stored code, the execution of the code transforms the general purpose computer into a special purpose computer for executing the processing shown herein. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 22 may include, for example, at least one of the cellular module 22a, a WiFi module 22b, a Bluetooth (BT) module 22c, a GNSS module 22d, a near field communication (NFC) module 22e, and a radio frequency (RF) module 22f. The cellular module 22a may provide, for example, a voice call, a video call, a text service, or an Internet service over a communication network. According to an embodiment, the cellular module 22a identifies and authenticates the electronic device 20 in a communication network by using the SIM 22g (e.g., a SIM card). According to an embodiment, the cellular module 22a performs at least one of functions that may be provided by the processor 21. According to an embodiment, the cellular module 22a may include a communication processor (CP). According to some embodiment, at least some (e.g., two or more) of the cellular module 22a, the WiFi module 22b, the BT module 22c, the GNSS module 22d, and the NFC module 22e may be included in one integrated chip (IC) or IC package. The RF module 22f may, for example, transmit and receive a communication signal (e.g., an RF signal). The RF module 22f may include a transceiver, a power amp module (PAM), a frequency filter, a low noise amplifier (LNA), or an antenna. According to another embodiment, at least one of the cellular module 22a, the WiFi module 22b, the BT module 22c, the GNSS module 22d, and the NFC module 22e may transmit and receive an RF signal through the separate RF module. The SIM 22g may, for example, include a card including an SIM or an embedded SIM, and may include unique identification information (e.g., an integrated circuit card identifier (ICCID) or subscriber information (e.g., an international mobile subscriber identity (IMSI)).

The memory 23 may include an internal memory 22a or an external memory 23b. The internal memory 22a may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 23b may further include flash drive, for example, compact flash (CF), secure digital (SD), micro-SD, mini-SD, extreme Digital (xD), a multi-media card (MMC), or a memory stick. The external memory 23b may be functionally or physically connected with the electronic device 20 through various interfaces.

The sensor module 24 measures physical quantity or senses an operation state of the electronic device 20 to convert the measured or sensed information into an electric signal. The sensor module 24 may, for example, include at least one of a gesture sensor 24a, a gyro sensor 24b, a pressure sensor 24c, a magnetic sensor 24d, an acceleration sensor 24e, a grip sensor 24f, a proximity sensor 24g, a color sensor 24h (e.g., RGB sensor), a biometric sensor 24i, a temperature/humidity sensor 24j, an illumination sensor 24k, and a ultraviolet (UV) sensor 241. Additionally or alternatively, the sensor module 24 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 24 may further include a control circuit for controlling at least one sensor included therein. In some embodiment, the electronic device 20 may further include a processor configured to control the sensor module 24 as part of or separately from the processor 21, to control the sensor module 24 during a sleep state of the processor 21.

The input module 25 may include, for example, a touch panel 25a, a (digital) pen sensor 25b, a key 25c, or an ultrasonic input device 25d. The touch panel 25a may use at least one of a capacitive type, a resistive type, an IR type, or an ultrasonic type. The touch panel 25a may further include a control circuit. The touch panel 25a may further include a tactile layer to provide tactile reaction to the user. The (digital) pen sensor 25b may include a recognition sheet which is a part of the touch panel 25a or a separate recognition sheet. The key 25c may also include, for example, a physical button, an optical key, or a keypad. The ultrasonic input device 25d senses ultrasonic waves generated by an input means through a microphone (e.g., the microphone 28d) and checks data corresponding to the sensed ultrasonic waves.

The display 26 may include a panel 26a, a hologram device 26b, a projector 26c, and/or a control circuit for controlling them. The panel 26a may be implemented to be flexible, transparent, or wearable. The panel 26a may be configured with the touch panel 25a in one module. According to an embodiment, the panel 26a may include a pressure sensor (or a "force sensor", interchangeably used hereinafter) capable of measuring a strength of a pressure by a user's touch. The pressure sensor may be implemented integrally with the touch panel 25a or may be implemented as one or more sensors separate from the touch panel 25a. The hologram device 26b shows a stereoscopic image in the air by using interference of light. The projector 26c displays an image onto an external screen through projection of light. The screen may be positioned inside or outside the electronic device 20. According to an embodiment, the interface 27 may include a high-definition multimedia interface (HDMI) 27a, a universal serial bus (USB) 27b, an optical communication 27c, or a D-subminiature 27d. Additionally or alternatively, the interface 27 may include, for example, an MHL interface, an SD card/MMC interface, or an IrDA standard interface.

The audio module 28 bi-directionally converts sound and an electric signal. The audio module 28 processes sound information input or output through the speaker 28a, the receiver 28b, the earphone 28c, or the microphone 28d. The camera module 29a is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 29d manages power of the electronic device 20. According to an embodiment, the power management module 29d may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 29e6 or the voltage, current, or temperature of the battery 29e during charging. The battery 29e may include a rechargeable battery and/or a solar battery.

The indicator 29b displays a particular state, for example, a booting state, a message state, or a charging state, of the electronic device 20 or a part thereof (e.g., the processor 21). The motor 29c converts an electric signal into mechanical vibration or generates vibration or a haptic effect. The electronic device 20 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 20) may be omitted or may further include other elements, and some of the components may be coupled to form one entity and identically perform functions of the components before being coupled.

Figure 2:
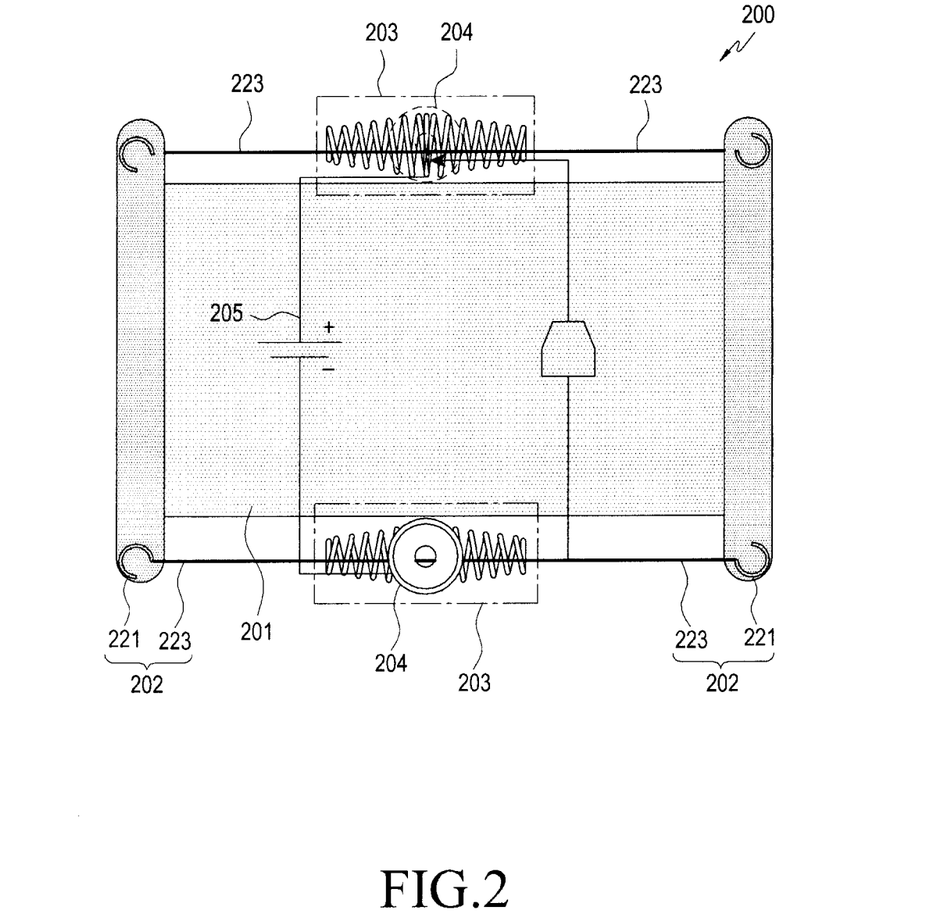
FIG. 2 is a structural diagram of a display device according to one embodiment of the present disclosure.

FIG. 2 is a structural diagram of a display device 200 according to one embodiment of the present disclosure.

Referring to FIG. 2, the display device 200 may include a display panel 201 (e.g., the panel 26a of FIG. 1), a link part 202, and a driving device 203. In an embodiment, the display panel 201 has flexibility, and the driving device 203 drives the link part 202 to adjust a form, e.g., curvature, of the display panel 201. For example, the driving device 203 may be connected to one end of the link part 202, which may be a wire, to move the link part 202, and another end of the link part 202 may be connected to any one of opposite end portions of the display panel 201, such that the curvature of the display panel 201 may be adjusted according to the driving of the link part 202 as one or more end portions of the display panel 201 are moved by the link part 202.

According to one embodiment, the driving device 203 is provided in opposite sides of the display panel 201, and may include a stopper part 204 for fixing the link part 202 in a specific position when the link part 202 is placed at a desired position. According to one embodiment, the driving device 203 may include a shape memory alloy member transformed according to an ambient temperature, and may further include a temperature control device to cause the transformation of the shape memory alloy member. The shape memory alloy member is adapted to assume a predetermined shape at a predetermined temperature, and is adapted to assume a different shape at another predetermined temperature. The temperature control device may control a temperature of the shape memory alloy member, and may include, for example, a circuit (e.g., a heating circuit 205) for heating the shape memory alloy member. For example, the driving device 203 may include a metallic spring, at least a portion of which may be manufactured using a shape memory alloy. In another embodiment, a heat emitter of the heating circuit 205 may include a Nichrome wire, and the heat emitter of the heating circuit 205 is a portion of the spring of the driving device 203 or is wound around an outer circumferential surface of the spring structure. In another embodiment, the heat emitter of the heating circuit 205 is disposed in adjacent to the shape memory alloy member and/or the spring of the driving device 203.

According to one embodiment, the link part 202 may include fixing members 221 provided in, for example, opposite ends of the display panel 201. Link members 223, extending from each fixing members 221, respectively, are connected to the driving device 203. For example, one end of the link part 202 may be connected to at least one end portion of the display panel 201, via the fixing members 221, and another end of the link part 202 may be connected to the driving device 203. The driving device 203 may drive the link part 202 by controlling the temperature of the shape memory alloy member with the temperature control device. For example, the link part 202 may be driven by controlling the temperature of the shape memory alloy member to reach a predetermined temperature, at which point the shape memory alloy member assumes a predetermined shape. The assumption of the shape may in turn generate a force that drives the link member 223.

In an embodiment, the driving device 203 drives the link members 223, and in FIG. 2, the link members 223 located in the left side of the driving device 203 and the link members 223 located in the right side of the driving device 203 simultaneously move in opposite directions with respect to each other. In another embodiment, the driving device 203 drives the link members 223 independently, and in FIG. 2, the link member 223 located in the upper left side and the link member 223 located in the upper right side or the lower right side move independently of each other. As a result, the display device 200 may variably adjust the curvature of a first portion of the screen display region and the curvature of a second portion, based on position and distance of a user or a number of users, thereby causing transformation of the display to optimize displaying content to the users.

A more detailed description will be made of a structure of a display device and/or an electronic device according to various embodiments of the present disclosure with reference to FIG. 3.

Figure 3:
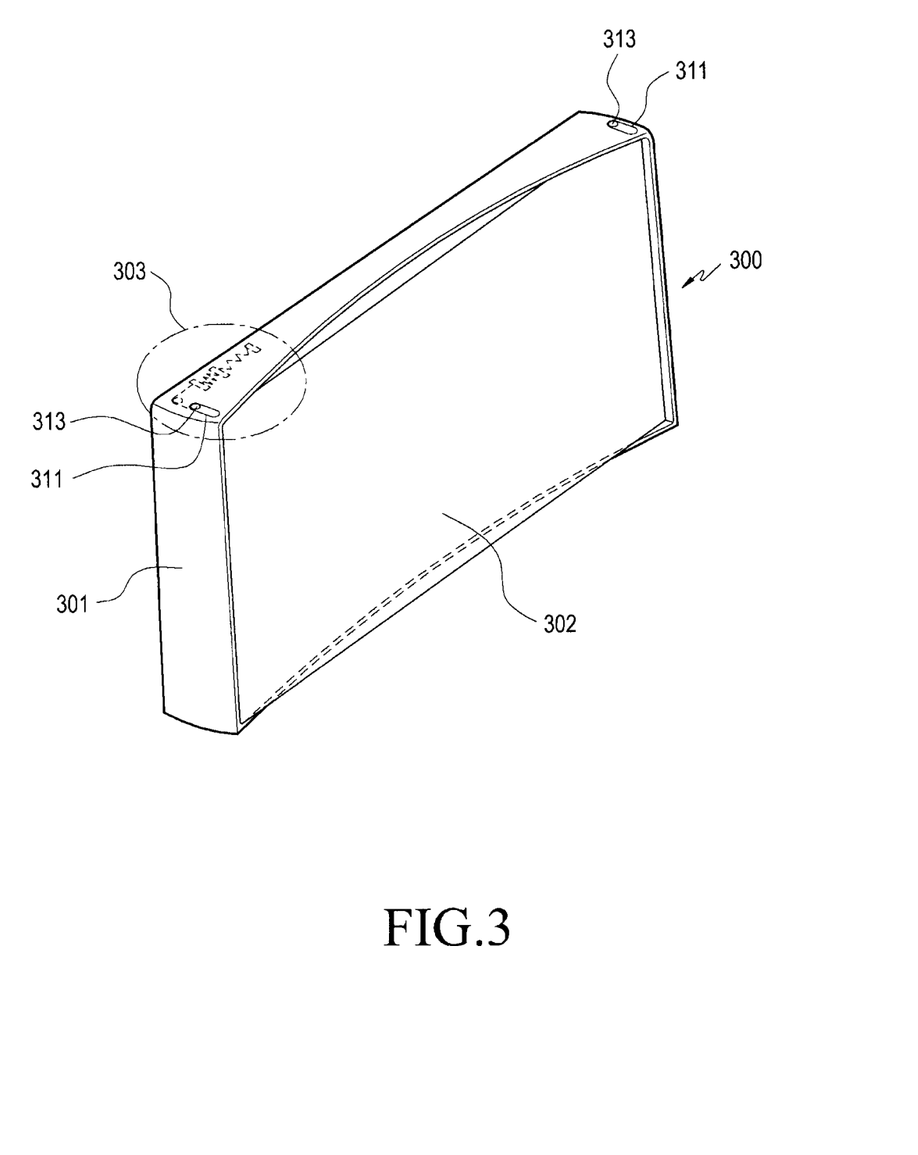
FIG. 3 is a perspective view of a display device (and/or an electronic device) according to one embodiment of the present disclosure.
Figure 4:
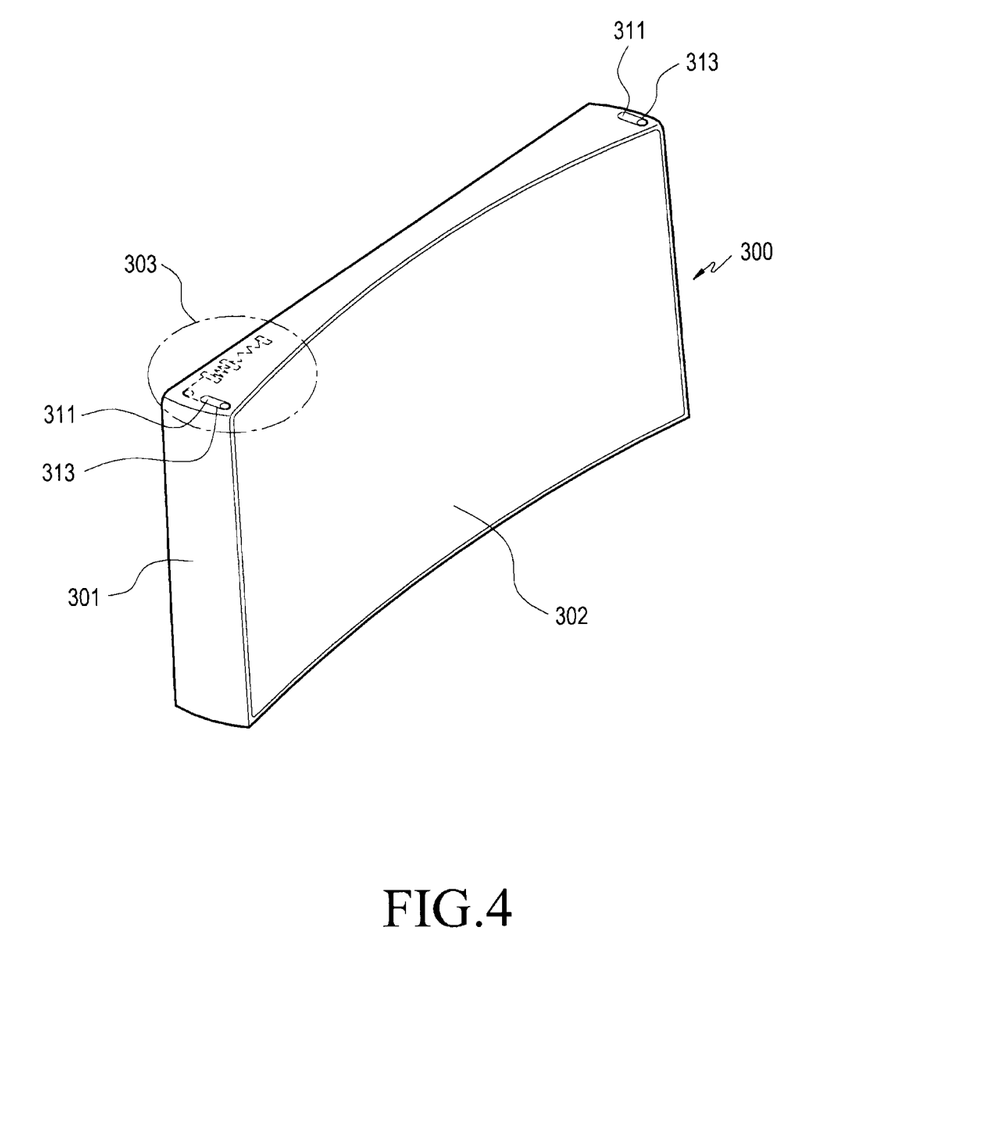
FIG. 4 is a perspective view showing a state in which a display panel of a display device (and/or an electronic device) according to one embodiment of the present disclosure is transformed into a curved surface.

FIG. 3 is a perspective view of a display device 300 (and/or an electronic device) according to one embodiment of the present disclosure. FIG. 4 is a perspective view showing a state in which a display panel of the display device 300 (and/or an electronic device) according to one embodiment of the present disclosure is transformed into a curved surface.

Referring to FIGS. 3 and 4, the display device 300 may include a housing 301 including a flexible display panel 302 on a front surface thereof, a driving device 303 for adjusting the form of the display panel 302 inside the housing 301, and/or a link part. Like in a previous embodiment, the driving device 303 may be provided in opposite sides of the display panel 302 (the second driving device is not shown). In another embodiment, a plurality of driving devices 303 are disposed in four corner portions of the display panel 302, and independently or simultaneously adjust the curvature of a portion of the display panel 302.

In an embodiment, the display device 300 may include guide hole(s) 311 formed in the housing 301 and a guide pin 313 provided on the display panel 302. The guide pin 313 is received in the guide hole 311 which extends along a predetermined trajectory and sets a trajectory and a range of movement of the guide pin 313. For example, the display panel 302 may be transformed along a trajectory of the guide pin 313. In another embodiment, the guide hole 311 and/or the guide pin 313 are provided in four corner portions of the display panel 302, respectively, and a trajectory and/or a length of the guide hole 311 is set according to flexibility and a transformable range of the display panel 302.

According to one embodiment, when the driving device 303 drives the link part (e.g., the link part 202 of FIG. 2), the guide pin 313 moves along the guide hole 311. In this embodiment, the guide hole 311 may comprise two guide holes that are disposed in opposite sides of a top portion of the housing 301 and/or in opposite sides of a bottom portion of the housing 301. When the driving device 303 operates, the form (e.g. curvature) of the display panel 302 is adjusted such that the opposite sides of the display panel 302 are symmetric with respect to each other. In another embodiment, the driving device 303 may comprise two or four driving devices that are disposed in the opposite sides of the top portion of the housing 301 and/or in the opposite sides of the bottom portion of the housing 301. Accordingly, the form of the display panel 302 at each corner of the display panel 302 may be changed independently according to the driving of the driving device 303. For example, the driving device 303 may perform independent driving according to a position in which the driving device 303 is disposed.

The structure and operating principle of the driving device 303 will be described in more detail with reference to FIG. 5.

Figure 5:
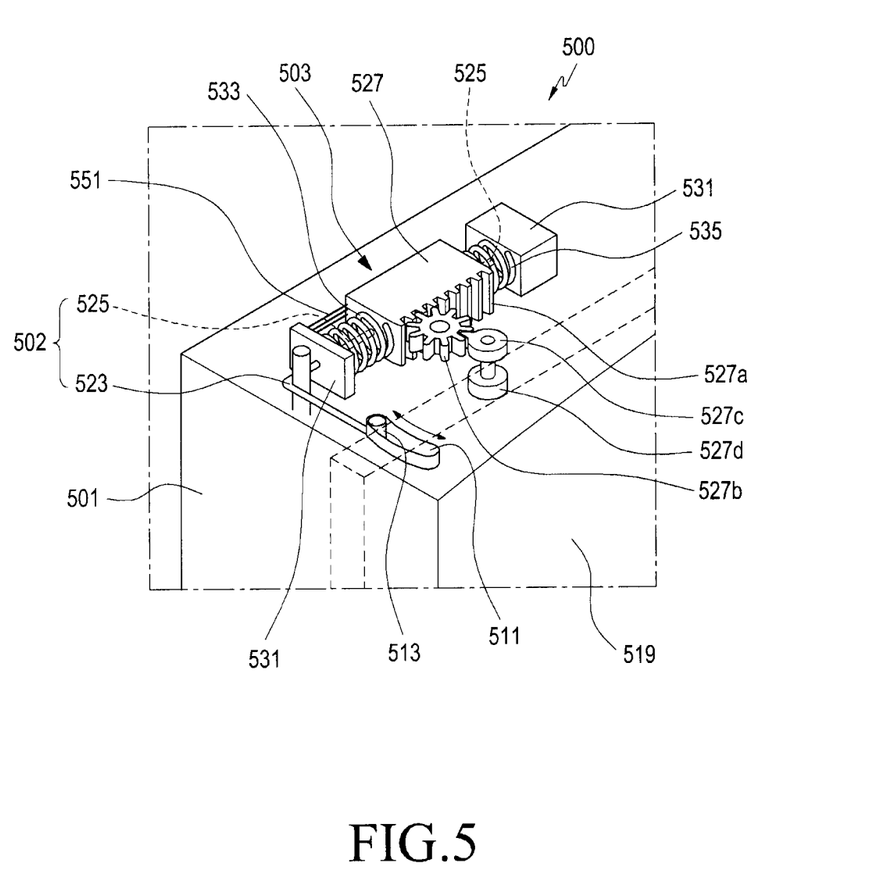
FIG. 5 is a view showing a driving device of a display device (and/or an electronic device) according to one embodiment of the present disclosure.

FIG. 5 is a view showing a driving device 503 of a display device 500 (and/or an electronic device) according to one embodiment of the present disclosure.

According to one embodiment, the driving device 503 may include a base member 531, a support member 527, and an elastic member 535, and drives a link part 502 by using a shape memory alloy member 533 and elasticity of the elastic member 535. The link part 502 may include a connecting member(s) 523 connected to the display panel 519 (e.g., connected to the display panel 519 through the fixing member 221 of FIG. 2) and a driving pin 525 connected to an end portion of the connecting member 523 to linearly move by the driving device 503.

In an embodiment, the display device 500 and/or the driving device 503 may include a stopper part (e.g., the stopper part 204 of FIG. 2) which may include a first gear 527a linked to the driving pin 525 and a second gear 527c selectively engaged to the first gear 527a, and when the second gear 527c is engaged to the first gear 527a, the linear movement of the driving pin 525 may be restricted. In another embodiment, the stopper part may further include a third gear 527b that is rotatably engaged to the first gear 527a when the first gear 527a linearly moves together with the driving pin 525. For example, the first gear 527a and the third gear 527b may be linked to each other in a rack-pinion gear structure, and the second gear 527c may be selectively engaged with the third gear 527b to restrict the rotation of the third gear 527b.

According to one embodiment, when the driving device 503 operates to drive the link part 502, the guide pin 513 of the display panel 519 moves along the guide hole 511 formed in the housing 501, thereby adjusting the form (e.g. the curvature) of the display panel 519 (or a portion of the display panel 519). According to an embodiment, the direction or trajectory of the transformation of the display panel 519 by the link part 502 is set according to a trajectory of the guide hole 511, and may be properly designed in a product manufacturing stage, based on a use environment of the display device 500 and/or an electronic device on which the display device 500 is mounted.

According to one embodiment, the base member 531 (comprising two members as shown in FIG. 5) is a structure for supporting the shape memory alloy member 533 (e.g., a shape memory alloy spring) and mounting and supporting the driving pin 525 to enable linear movement of the driving pin 525. In an embodiment, the support member 527 is disposed between a first inner wall and a second inner wall of the base member 531 (e.g. an inner wall of the first member of the base member 531 and an inner wall of the second member of the base member 531) and is fixed to the driving pin 525. For example, the support member 527 may linearly move together with the driving pin 525 in relation to the base member 531. In another embodiment, regarding the stopper part of the driving device 503, the first gear 527a may include gear teeth (e.g., a plane gear) formed on one side of the support member 527, and the second gear 527c may be selectively engaged to the first gear 527a. For example, the second gear 527c is engaged to the first gear 527a to restrict the linear movement of the driving pin 525 when the driving pin 525 moves to a predetermined or desired position. According to one embodiment, the third gear 527b may include a sun gear rotating together with the linear movement of the first gear 527a, and as the second gear 527c is engaged with the third gear 527b, rotation of the third gear 527b and/or linear movement of the first gear 527a may be restricted. In another embodiment, the stopper part may further include a driving portion for rotating the second gear 527c, e.g., a driving motor 527d.

In an embodiment, the elastic member 535 is disposed between the first inner wall of the base member 531 and the support member 527 to provide an elastic force in a direction urging the support member 527 away from the first inner wall of the base member 531. The second inner wall of the base member 531 is disposed to face the first inner wall, having the support member 527 between the second inner wall and the first inner wall, and opposite ends of the shape memory alloy member 533 are supported between the second inner wall of the base member 531 and the support member 527. For example, the shape memory alloy member 533, if being heated to a predetermined temperature, may provide an elastic force in a direction urging the driving pin 525 and/or the support member 527 away from the second inner wall. As the link part 502 is driven by a resultant force between a force provided by the elastic member 535 and a force provided by the shape memory alloy member 533, a position of the driving pin 525 may be set.

In an embodiment, when the driving pin 525 moves to a set position by transformation of the shape memory alloy member 533, the driving motor 527d operates such that the second gear 527c is engaged with the first gear 527a (or the third gear 527b), thus restricting the linear movement of the support member 527 and the driving pin 525. For example, when the user desires to change the form of the display panel 519 while watching broadcasting or videos, etc., through the display device 500 (and/or an electronic device including the display device 500), 1) the heating circuit (e.g., a heat emitter 551) operates to transform the shape memory alloy member 533, 2) the driving pin 525 and/or the support member 527 linearly moves as a repulsive force between the shape memory alloy member 533 and the elastic member 535 changes, and 3) as the driving pin 525 linearly moves, the connecting member 523 moves the fixing member (e.g., the fixing member 221 of FIG. 2) and/or the guide pin 513, thus changing the form, e.g. curvature, of the display panel 519.

Once the form of the display panel 519 is properly adjusted, the user stops form adjustment, and when the user remotely instructs the stop of the form adjustment, in the display device 500 and/or the electronic device including the display device 500, 1) the driving motor 527d is driven to rotate the second gear 527c, 2) the second gear 527c is engaged with the first gear 527a (or the third gear 527b) to fix a position of the support member 527 and/or a position of the driving pin 525, and 3) after the position of the driving pin 525 is fixed, the operation of the heating circuit (e.g., the heat emitter 551) may be stopped.

When the operation of the heating circuit is stopped, the force of the shape memory alloy member 533 no longer exists and only the elastic force of the elastic member 535 exists, but the linear movement of the driving pin 525 is restricted by the engagement of the second gear 527c with the first gear 527a, such that the display panel 519 maintains the form-adjusted state (e.g., a curved-surface state). When the user instructs return to a state before the adjustment (e.g., a flat-surface state), 1) the display device 500 operates the driving motor 527d to disengage the second gear 527c from the first gear 527a, and 2) as the second gear 527c is disengaged from the first gear 527a, the driving pin 525 returns by the force of the shape memory alloy member 533 returning to the previous shape, such that the display panel 519 returns to the before-adjustment state (e.g., the flat-surface state).

A more detailed description will now be made of the operating principle of the driving device with reference to FIGS. 6 and 7.

Figure 6:
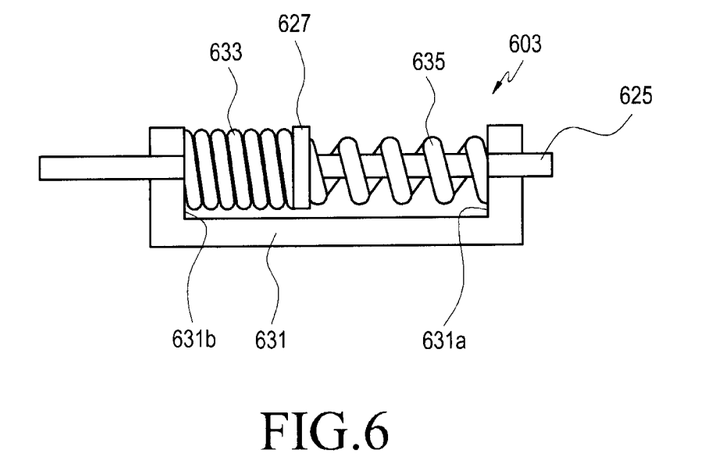
FIGS. 6 and 7 are other views showing a driving device of a display device (and/or an electronic device) according to one embodiment of the present disclosure.
Figure 7:
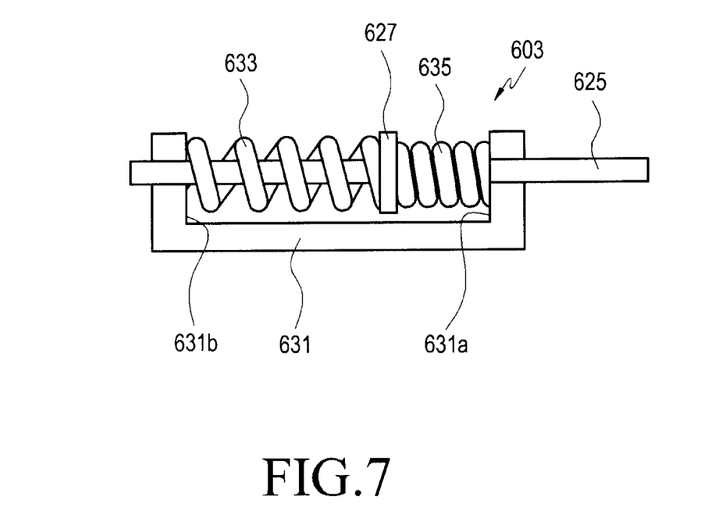

FIGS. 6 and 7 are views showing a driving device 603 of a display device (and/or an electronic device) according to one embodiment of the present disclosure.

Referring to FIGS. 6 and 7, the driving device 603 may include a base member 631, a support member 627, an elastic member 635, and/or a shape memory alloy member 633, and the driving pin 625 linearly moves in relation to the base member 631 according to a heated state of the shape memory alloy member 633.

According to one embodiment, the base member 631 may include a first inner wall 631a and a second inner wall 631b that face each other, and the driving pin 625 is disposed to pass through the first inner wall 631a and the second inner wall 631b to move linearly in relation to the base member 631. The support member 627 is fixed on the driving pin 625 between the first inner wall 631a and the second inner wall 631b to linearly move together with the driving pin 625 on the base member 631. The elastic member 635 is disposed between the first inner wall 631a and the support member 627 to provide an elastic force in a direction urging the support member 627 away from the first inner wall 631a. Opposite ends of the shape memory alloy member 633 are supported between the second inner wall 631b and the support member 627, respectively.

Until the heating circuit and/or the heat emitter (e.g., the heat emitter 551 of FIG. 5) operate, the elastic force of the elastic member 635 is applied such that the support member 627 is fixed and maintained in a position away from the first inner wall 631a. When the heat emitter does not operate, there may be a force applied by the shape memory alloy member 633 on the support member 627, but the elastic force of the elastic member 635 may be greater than the force of the shape memory alloy member 633. Accordingly, when these forces are in equilibrium, the driving pin 625 may maintain its state and does not further protrude outwardly from the second inner wall 631b.

When the heating circuit and/or the heat emitter operates to heat the shape memory alloy member 633 (e.g., the shape memory alloy spring), the shape memory alloy member 633 gradually expands and thus causes the linear movement of the driving pin 625. When the heat emitter operates, a force on the support member 627 by the expansion of the shape memory alloy member 633 may be greater than the elastic force of the elastic member 635. Accordingly, the driving pin 625 may be driven to protrude further outwardly from the first inner wall 631a.

According to one embodiments, as the driving pin 625 linearly moves, the connecting member (e.g., the connecting member 523 of FIG. 5), the fixing member (e.g., the fixing member 221 of FIG. 2), and/or the guide pin (e.g., the guide pin 513 of FIG. 5) also move, thus adjusting the form of the display panel (e.g., the display panel 519 of FIG. 5). In an embodiment, when the operations of the heating circuit and the heat emitter (e.g., the heat emitter 551 of FIG. 5) are stopped, the shape memory alloy member 633 shrinks and the elastic force of the elastic member 635 works, thus moving the driving pin 625 to further protrude outwardly from the second inner wall 631b. In another embodiment, if the second gear (e.g., the second gear 527c of FIG. 5) is engaged with the first gear (e.g., the first gear 527a of FIG. 5) (or the third gear (e.g., the third gear 527b of FIG. 5) in the expansion state of the shape memory alloy member 633, then the form-adjusted state of the display panel (e.g., the display panel 519 of FIG. 5) may be maintained because the movement of the support member 627 is restricted. For example, as the first gear 527a, the second gear 527c, etc., of FIG. 5 operate, the display panel may be maintained in the form-adjusted state without the operation of the heating circuit.

According to another embodiment, the display device (e.g., the display device 500 of FIG. 5) may include a plurality of driving devices (e.g., the driving device 503 of FIG. 5) which may operate independently or simultaneously. For example, on the display panel 519 shown in FIG. 5, if a first portion is transformed into a concave form, then a second portion that is different from the first portion may be transformed into a convex form. In another embodiment, the plurality of driving devices linearly move different driving pins, respectively, and the driving pins are connected to different link members to adjust different portions on the display panel, respectively. In another embodiment, a plurality of driving pins operate with one driving device, on which the plurality of driving pins may linearly move independently of each other.

Figure 8:
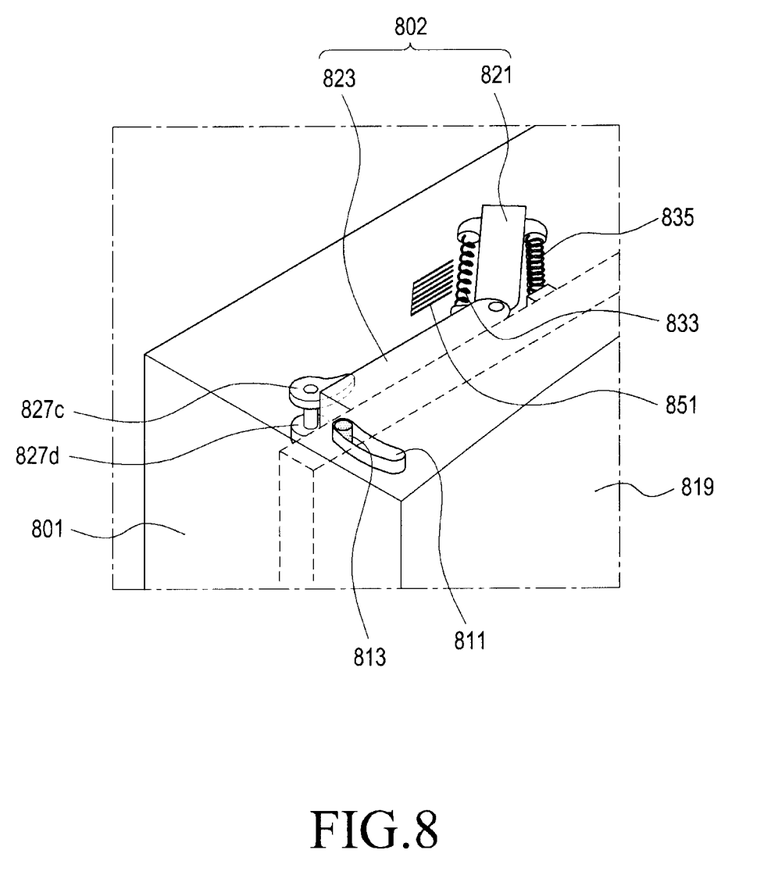
FIG. 8 is a view showing a driving device of a display device (and/or an electronic device) according to another embodiment of the present disclosure.
Figure 9:
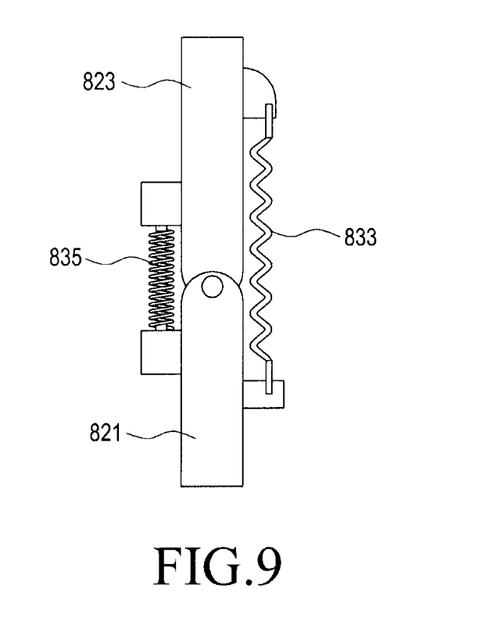
FIGS. 9 and 10 are other views showing a driving device of a display device (and/or an electronic device) according to another embodiment of the present disclosure.
Figure 10:
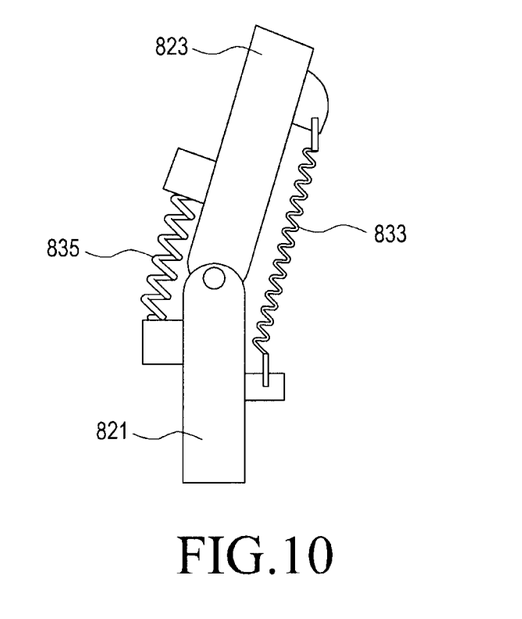

FIG. 8 is a view showing a driving device of a display device 800 (and/or an electronic device) according to another embodiment of the present disclosure. FIGS. 9 and 10 are other views showing a driving device of the display device 800 (and/or an electronic device) according to another embodiment of the present disclosure.

The display device 800 (and/or an electronic device) according to the current embodiment is different from that in the previous embodiment in terms of a structure of a driving device (and/or a link part). In a description of a display device according to the current embodiment, for a structure that may be easily understood from the previous embodiment, a reference numeral and/or a detailed description may not be provided.

Referring to FIG. 8, a link part 802 of the display device 800 may include a first link member 823 mounted to a housing 801 with a pivot, and as the first link member 823 pivots by the driving device, the form of a display panel 819 may be adjusted. In an embodiment, the link part 802 may further include a second link member 821 extending from an inner wall of the housing 801, and one end portion of the first link member 823 is pivotally coupled to one end portion of the second link member 821.

The display device 800 may include a driving device for pivoting the first link member 823, and a shape memory alloy member 833 of the driving device is disposed on one side of the first link member 823. For example, as a heat emitter 851 of a heating circuit operates, the shape memory alloy member 833 may expand or shrink, thus causing the first link member 823 to pivot. In an embodiment, the shape memory alloy member 833 has a spring shape, one end of which is supported in the housing 801 (or the second link member 821) and another end of which is supported in the first link member 823, and the heat emitter 851 is provided in adjacent to the shape memory alloy member 833 or as a part of the shape memory alloy member 833 in the housing 801.

According to one embodiments, the driving device may further include an elastic member 835 that provides an elastic force to the first link member 823 and disposed on the other side of the first link member 823. Referring to FIGS. 9 and 10, a resultant force between the force provided by the elastic member 835 and the force provided by the shape memory alloy member 833 may vary according to whether the heat emitter 851 performs a heating operation, and the pivot of the first link member 823 with respect to the housing 801 and/or the second link member 821 may be adjusted according to the resultant force between the force provided by the elastic member 835 and the force provided by the shape memory alloy member 833.

In an embodiment, another end portion of the first link member 823 cooperates the display panel 819, such that the form of the display panel 819 is adjusted by pivoting of the first link member 823. In another embodiment, a transformation range or a transformed shape of the display panel 819 may be set according to a trajectory of a guide pin 813 formed in the display panel 819 and a trajectory of a guide hole 811 guiding movement of the guide pin 813.

In another embodiment, the driving device may further include a stopper member 827c provided on a side of the first link member 823 in a position adjacent to the another end portion of the first link member 823. The stopper member 827c may be a rotator that eccentrically rotates on the housing 801. For example, a range in which the first link member 823 pivots may be partially restricted by a rotation angle of the stopper member 827c. According to one embodiment, the stopper member 827c is connected to and mounted on a driving part, e.g., a driving motor 827d, to rotate according to an operation of the driving motor 827d. In an embodiment, when the first link member 823 pivots and the form of the display panel 819 is adjusted, the stopper member 827c may rotate and stop in a position interfering with the first link member 823. For example, if the heat emitter 851 does not operate, the elastic force of the elastic member 835 may work to pivot the first link member 823, and the stopper member 827c interferes with the first link member 823 to fix the first link member 823. As the first link member 823 is fixed and pivoting thereof is restricted, the display device 800 maintains the form-adjusted state of the display panel 819.

Figure 11:
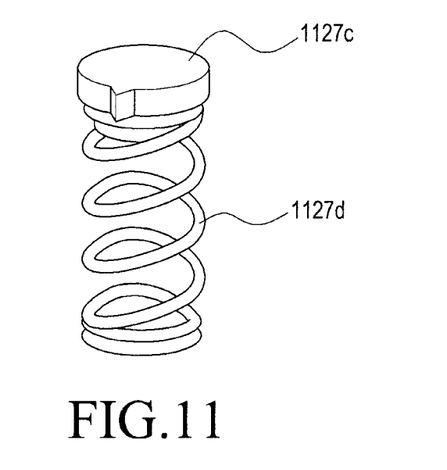
FIG. 11 is a view showing a stopper structure of a display device (and/or an electronic device) according to one embodiment of the present disclosure.

FIG. 11 is a view showing a stopper structure of a display device (and/or an electronic device) according to one embodiment of the present disclosure.

A display device according to one embodiment of the present disclosure includes a stopper part and/or a stopper member, thereby restricting linear movement of a driving pin or pivoting of a first link member and maintaining a form-adjusted state of a display panel. In the foregoing embodiments, a stopper structure operates by causing a second gear and/or a stopper member to rotate using a driving motor, and the present disclosure is not limited thereto. For example, referring to FIG. 11, a display device according to one embodiment of the present disclosure may adjust a position of a second gear and/or a stopper member 1127c by using a second shape memory alloy member 1127d. The second shape memory alloy member 1127d causes the rotation or linear movement of the second gear and/or the stopper member 1127c, and thus causes the second gear and/or the stopper member 1127c to be engaged to the first gear (e.g., the first gear 527a of FIG. 5) or to interfere with the first link member (e.g., the first link member 823 of FIG. 8).

Figure 12:
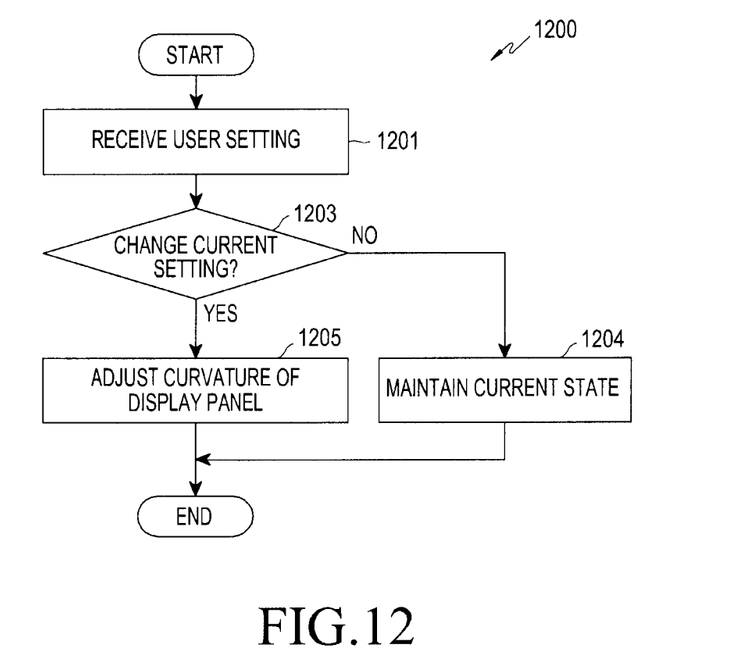
FIG. 12 is a flowchart of a method for controlling a form of a display panel of a display device (and/or an electronic device) according to one embodiment of the present disclosure.

FIG. 12 is a flowchart of a method 1200 for controlling a form of a display panel of a display device (and/or an electronic device) according to one embodiment of the present disclosure.

Referring to FIG. 12, the method 1200 may include operation 1201 of receiving user setting, operation 1203 of determining whether the received user setting is intended to change current setting, and operation 1204 of maintaining a current state or operation 1205 of adjusting a form based on the determination of whether the received user setting is intended to change the current setting.

In an embodiment, operation 1201 of receiving the user setting is an operation of receiving a user instruction related to adjustment of a form, etc., of a display panel (e.g., the display panel 519 of FIG. 5), and the user instruction may be received through a remote controller or a control panel provided in a display device (e.g., the display device 500 of FIG. 5).

Once the user setting is received, in operation 1203 of determining whether the received user setting is intended to change the current setting, the display device or a processor (e.g., the processor 21 of FIG. 1) of the display device compares a current form state of the display panel with the received user setting. If the current form state is identical to the user setting, the display device maintains the current form state in operation 1204. If the current form state is not identical to the user setting, the display device determines that the user setting is an instruction for adjusting the form of the display panel.

If determining that the user setting is an instruction for adjusting the form of the display panel, the display device adjusts the form in operation 1205. For example, the driving device (e.g., the driving device 503 of FIG. 5) operates according to the received user setting to adjust the form of the display panel, and the stopper part (or the stopper member) operates to maintain the form-adjusted state.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

As described above, a display device and/or an electronic device including the same according to various embodiments of the present disclosure includes a flexible display panel, a driving device comprising a shape memory alloy member and a temperature control device adapted to control a temperature of the shape memory alloy member, the shape memory alloy member adapted to assume a predetermined shape at a predetermined temperature, and a link part, one end of which is connected to at least one end portion of the flexible display panel and another end of which is connected to the driving device, in which the driving device change a curvature of the flexible display by controlling the temperature of the shape memory alloy member using the temperature control device, so that a force generated by shape memory alloy member when assuming the predetermined shape drives the link part to move the at least one end portion of the flexible display panel.

According to various embodiments, the temperature control device may include a circuit adapted to heat or transform the shape memory alloy member, and the shape memory alloy member may include a shape memory spring.

According to various embodiments, the circuit may include a heating wire that forms a portion of the shape memory alloy member.

According to various embodiments, the link part may include a fixing member fixed to the at least one end portion of the flexible display panel, a link member extending from the fixing member, and a driving pin, one end of which is coupled to the link member and another end of the driving pin is coupled to the driving device, the driving pin adapted to be linearly moved by the driving device.

According to various embodiments, the driving device may include a base member having a first inner wall and a second inner wall facing each other and adapted to support the driving pin to allow linear movement of the driving pin, a support member fixed on the driving pin and disposed between the first inner wall and the second inner wall of the base member, and an elastic member disposed between the first inner wall and the support member to provide an elastic force in a direction urging the support member away from the first inner wall, and opposite ends of the shape memory alloy member may be supported by the second inner wall and the support member, respectively.

According to various embodiments, the driving device may include a first gear linked to the support member and a second gear selectively engaged with the first gear, in which as the teeth of the second gear is engaged with teeth of the first gear, linear movement of the support member is restricted.

According to various embodiments, the driving device may further include a driving motor adapted to rotate the second gear, and as the driving motor operates, the teeth of the second gear may be disengaged from the teeth of the first gear.

According to various embodiments, the display device may further include a second driving device connected to a second link part, one end of the second link part connected to another end portion of the flexible display panel.

According to various embodiments, the second driving device is connected to a second driving pin.

According to various embodiments, the display device may further include a housing adapted to receive at least a part of the flexible display panel, at least one guide hole formed in a sidewall of the housing, and a guide pin fixed to the flexible display panel and received in the guide hole, in which when the link part is driven by the force generated by shape memory alloy member, the guide pin moves along a path set by the guide hole.

According to various embodiments, the link part may include a first link member mounted to the housing, and as the first link member pivots by the force generated by shape memory alloy member, a curvature of the flexible display panel may be adjusted.

According to various embodiments, the driving device may further include an elastic member adapted to provide an elastic force to the first link member, and the shape memory alloy member is disposed on one side of the first link member, and the elastic member is disposed on another side of the first link member.

According to various embodiments, the driving device may further include a stopper member adapted to interfere with the first link member to restrict the pivoting of the first link member.

According to various embodiments, the driving device may further include a driving part adapted to rotate the stopper member so that the stopper member does not interfere with the first link member.

According to various embodiments, the link part may further include a second link member extending from an inner wall of the housing, and one end portion of the first link member may be pivotally coupled to one end portion of the second link member.

An electronic device according to various embodiments of the present disclosure may include the above-described display device.

With the display device and/or the electronic device according to various embodiments of the present disclosure, the user may properly adjust the form of the flexible display panel to fit for a user's own viewing environment by using a driving device including a shape memory alloy member. For example, based on a user's relative position with respect to the display panel (or the electronic device), a comfortable viewing environment may be easily created.

While embodiments of the present disclosure have been described, various changes may be made without departing the scope of the present disclosure.

What is claimed is:

1. A display device comprising: a flexible display panel; at least one driving device having a shape memory alloy member and a temperature control device adapted to control a temperature of the shape memory alloy member; and a-link parts wherein one of the link parts, connects to one end portion of the flexible display panel to the at least one driving device and another of the link parts connects another end portion of the flexible display panel to the at least one driving device, wherein the at least one driving device is configured to change a curvature of the flexible display panel such that the temperature control device controls the temperature of the shape memory alloy member, so that a shape of the shape memory alloy member is changed into a predetermined shape and the shape memory alloy member generates a force driving the link parts to move the one end or the another end portion of the flexible display panel, wherein each of the link parts comprises: a fixing member provided in one of the one end and the another end of the flexible display panel; a link member extending from the fixing member; and a driving pin coupled to at least one end portion of the link member, wherein the driving pin is adapted to be linearly moved by the at least one driving device, wherein the at least one driving device comprises: a base member having a first inner wall and a second inner wall facing each other and adapted to support the driving pin to allow linear movement of the driving pin; a support member fixed on the driving pin and disposed between the first inner wall and the second inner wall of the base member; a first gear linked to the support member; a second gear selectively engaged with the first gear, when teeth of the second gear is engaged with teeth of the first gear, linear movement of the support member is restricted, and an elastic member disposed between the first inner wall and the support member to provide an elastic force in a direction urging the support member away from the first inner wall, wherein opposite ends of the shape memory alloy member are supported by the second inner wall and the support member, respectively.

2. The display device of claim 1, wherein the temperature control device comprises a circuit adapted to heat or transform the shape memory alloy member, and the shape memory alloy member comprises a shape memory spring.

3. The display device of claim 2, wherein the circuit comprises a heating wire that forms a portion of the shape memory alloy member.

4. The display device of claim 1, wherein the driving device further comprises a driving motor adapted to rotate the second gear, and when the driving motor is in operation, the teeth of the second gear is disengaged from the teeth of the first gear.

5. The display device of claim 1, wherein the display device comprises a plurality of the driving device, each of the plurality of the driving device corresponds to one of the link parts.

6. The display device of claim 1, further comprising:

a housing adapted to receive at least a part of the flexible display panel;

at least one guide hole formed in a sidewall of the housing; and a guide pin fixed to the flexible display panel and received in the guide hole, wherein when each of the link parts is driven by the force generated by shape memory alloy member, the guide pin moves along a path set by the guide hole.

7. The display device of claim 6, wherein each of the link parts comprises a first link member mounted to the housing, and when the first link member pivots by the force generated by shape memory alloy member, the curvature of the flexible display panel is adjusted.

8. The display device of claim 7, wherein the driving device further comprises an elastic member adapted to provide an elastic force to the first link member, wherein the shape memory alloy member is disposed on one side of the first link member and the elastic member is disposed on another side of the first link member.

9. The display device of claim 8, wherein the driving device further comprises a stopper member adapted to interfere with the first link member to restrict the pivoting of the first link member.

10. The display device of claim 9, wherein the driving device further comprises a driving part adapted to rotate the stopper member so that the stopper member does not interfere with the first link member.

11. The display device of claim 7, wherein each of the link parts further comprises a second link member extending from an inner wall of the housing, and one end portion of the first link member is pivotally coupled to one end portion of the second link member.

12. An electronic device comprising the display device of claim 1.

* * * * *